(12) United States Patent
Wetherell

(10) Patent No.: US 10,100,206 B1
(45) Date of Patent: Oct. 16, 2018

(54) PRE-TREATMENT AND CLEANING OF EQUIPMENT USED WITH UNCURED CEMENTITIOUS MATERIALS

(71) Applicant: Mark Wetherell, Henderson, NV (US)

(72) Inventor: Mark Wetherell, Henderson, NV (US)

(73) Assignee: Arris Technologies, LLC, Heber City, UT (US)

( * ) Notice: Subject to any disclaimer, the term of this patent is extended or adjusted under 35 U.S.C. 154(b) by 450 days.

(21) Appl. No.: 14/601,198

(22) Filed: Jan. 20, 2015

Related U.S. Application Data

(60) Provisional application No. 61/929,355, filed on Jan. 20, 2014.

(51) Int. Cl.
| | | |
|---|---|---|
| *B24B 1/00* | (2006.01) | |
| *C09D 5/16* | (2006.01) | |
| *C11D 11/00* | (2006.01) | |
| *C11D 7/02* | (2006.01) | |
| *B24C 11/00* | (2006.01) | |

(52) U.S. Cl.
CPC .......... *C09D 5/1618* (2013.01); *B24C 11/00* (2013.01); *C11D 7/02* (2013.01); *C11D 11/0041* (2013.01); *C11D 11/0064* (2013.01)

(58) Field of Classification Search
USPC ........................................ 451/28, 32, 37, 38
See application file for complete search history.

(56) References Cited

U.S. PATENT DOCUMENTS

| | | | | |
|---|---|---|---|---|
| 5,507,875 A | * | 4/1996 | Hailey ................. | B08B 7/02 134/1 |
| 6,418,948 B1 | * | 7/2002 | Harmon ............ | B01F 15/00032 134/167 R |
| 8,852,334 B1 | * | 10/2014 | Hills .................. | C04B 28/02 106/600 |
| 2005/0202989 A1 | * | 9/2005 | Wilson ............... | C11D 11/0041 510/245 |
| 2010/0232253 A1 | * | 9/2010 | Lundberg ............ | B08B 9/00 366/68 |
| 2014/0113850 A1 | * | 4/2014 | Gayral Chirac ...... | C11D 1/825 510/109 |
| 2014/0220867 A1 | * | 8/2014 | Wetherell ............ | B24B 1/00 451/41 |

\* cited by examiner

*Primary Examiner* — Joseph J Hail
*Assistant Examiner* — Shantese McDonald
(74) *Attorney, Agent, or Firm* — Durham Jones & Pinegar, P.C., Intellectual Property Law Group

(57) ABSTRACT

A composition for pretreating surfaces of equipment for use with an uncured cementitious material, such as uncured concrete, and/or for cleaning cured cementitious material from the surfaces of such equipment includes an aqueous solution with colloidal silica. Pretreatment of a surface with such an aqueous solution may reduce or eliminate adhesion of uncured cementitious material to the surface. Cured cementitious material may be removed from equipment surfaces by wetting the cured cementitious material with the aqueous solution to chemically soften the cured cementitious material, along with abrading the cured cementitious material to mechanically remove the same from the equipment surfaces. Systems for removing cured cementitious material from the surfaces of equipment configured to use with uncured cementitious material include an abrasive element and an aqueous solution with colloidal silica.

19 Claims, No Drawings

PRE-TREATMENT AND CLEANING OF EQUIPMENT USED WITH UNCURED CEMENTITIOUS MATERIALS

TECHNICAL FIELD

This disclosure relates generally to techniques and systems for pretreating equipment for use in mixing, placing and/or finishing cementitious materials, including, but not limited to, cement, concrete and mortar. More specifically, this disclosure relates to the use of aqueous solutions that include colloidal silica to pretreat surfaces of equipment for mixing, placing and/or finishing cementitious materials to reduce or eliminate the adhesion of cementitious materials to pretreated surfaces. In addition, this disclosure relates to the use of abrasive materials and aqueous solutions that include colloidal silica to clean cured cementitious materials from surfaces of equipment used for mixing, placing and/or finishing cementitious materials, such as concrete, mortar or cement.

RELATED ART

Because of the high viscosity of uncured, or wet, cementitious materials (e.g., cement, concrete, mortar, etc.), equipment that is configured for use with uncured cementitious materials (e.g., cement mixers, forms, finishing tools, etc.) often remains coated with the cementitious materials after use—even when efforts are taken to clean the equipment. The cementitious material that remains on equipment hardens and cures. With repeated use, this residue builds up over time, resulting in relatively thick layers of cured cement, concrete or other cementitious materials on the equipment. Eventually, the build-up may prevent the equipment from functioning properly.

Removal of cured cementitious material from equipment typically requires the use of strong acids and appropriate measures for disposing of the acidic waste. The strong acids that are typically used to remove concrete, such as hydrochloric acid or muriatic acid, are not environmentally friendly and can be harmful to individuals who are cleaning the equipment.

While strong acids may soften the cured concrete, tools (e.g., chisels and hammers or mallets, jackhammers, etc.) are often still needed to mechanically remove the cured concrete from surfaces of the equipment. The use of tools to remove cured concrete can be labor-intensive. Because of the likelihood of flying debris and dust (which can cause silicosis or even lung cancer) generated by mechanical removal of cementitious materials, the use of tools, as well as the frequent use of strong acids in conjunction with mechanical removal processes, can be dangerous. Accordingly, safety equipment is also frequently needed.

When the cleaning process is complete, the waste materials, which are hazardous, must be properly disposed of, which may increase the expense of the cleaning process.

DISCLOSURE

A method for pre-treating equipment for use with uncured cementitious material, such as concrete, mortar, cement or the like, includes applying an aqueous solution that includes colloidal silica to a surface of the equipment before uncured cementitious material comes into contact with the surface. The aqueous solution may include a sufficient concentration of colloidal silica to reduce or eliminate the amount of uncured cementitious material that sticks or adheres to the surface and, thus, may subsequently have to be removed from the surface of the equipment.

Without limitation, an aqueous solution for pre-treating equipment that is to be used with uncured cementitious materials may comprise colloidal silica. Various embodiments of aqueous solutions that comprise, consist essentially of and consist of colloidal silica are disclosed in U.S. Pat. No. 8,852,334 ("the '334 patent"), the entire disclosure of which is hereby incorporated herein. Such an aqueous solution may comprise an aqueous solution with silica (i.e., silicon dioxide, or $SiO_2$) particles making up about 2% to about 30% (or, more specifically, about 4% to about 7%) of the weight of the aqueous solution. Stated another way, the silica solids content of such a composition may be about 2% to about 30%.

In some embodiments, the silica particles may be coated with a stabilizer, such as a metal or a metal-containing material (e.g., aluminum; an aluminum-containing material, such as alumina (i.e., aluminum oxide, or $Al_2O_3$); etc.), which enables the silica particles to remain in solution at relative low pH (e.g., 10 or less, 8.5 or less, 8 or less, 7 or less, about 3 to about 8, about 4 to about 7, about 3 to about 5, etc.). The presence of a stabilizer on the silica particles may, in some embodiments, enable the colloidal silica to be used in conjunction with an acid (e.g., hydrochloric acid, muriatic acid, etc.).

The hardener/densifier available from Global Polishing Systems, LLC of Henderson, Nev. as CDH-100 is a specific example of a colloidal silica that may be used in accordance with a pre-treatment process according to this disclosure.

After an aqueous solution that comprises colloidal silica has been applied to a surface of equipment configured for use with uncured cementitious materials, the surface may be permitted to dry (i.e., the water may evaporate from it) and, thus, a coating of dried colloidal silica may remain on and coat the surface before it comes into contact with uncured concrete. Alternatively, the surface may remain wetted with an aqueous solution that includes colloidal silica before the surface contacts uncured concrete.

Without limitation, such an aqueous solution may be applied to a surface of equipment for mixing cementitious materials (e.g., an interior surface of a drum of a cement mixer, etc.), equipment for placing cementitious materials, equipment for finishing cementitious materials (e.g., trowels, blades of power trowels, etc.), or any other equipment that will come into contact with an uncured cementitious material. In a specific embodiment, the aqueous solution may be introduced into a drum of mixing equipment (e.g., a cement mixer, etc.), and the drum may be rotated in a manner that enables the aqueous solution, and the colloidal silica, to coat interior surfaces of the drum. The aqueous solution may be removed before a concrete mix or any other mix for forming a cementitious material is introduced into the drum, or it may remain in place while a mix is introduced into the drum and, thus, form part of the mix. In other embodiments, an aqueous solution that comprises colloidal silica may be applied to a surface of equipment for placing or finishing cementitious materials. Various examples of the manner in which such an aqueous solution may be applied to such a surface include, but are not limited to, spraying to aqueous solution onto the surface, brushing or otherwise wiping the aqueous solution onto the surface and dipping the equipment, or at least the surface(s) that is (are) to be pre-treated, into the aqueous solution.

Equipment may be pre-treated in accordance with teachings of this disclosure when it is new or after it has been cleaned.

In another aspect, techniques and systems for removing cured cementitious material, such as cement, concrete or mortar, from surfaces of equipment include applying an aqueous solution that comprises colloidal silica to the cured cementitious material and abrading the cured cementitious material (e.g., with an abrasive element, etc.) while it is wetted with the aqueous solution.

The aqueous solution may comprise, consist essentially of or consist of colloidal silica, such as the aqueous solutions disclosed by the '334 patent. Such an aqueous solution may comprise an aqueous solution with silica (i.e., silicon dioxide, or $SiO_2$) particles making up about 2% to about 30% (or, more specifically, about 4% to about 7%) of the weight of the aqueous solution. Stated another way, the silica solids content of such a composition may be about 2% to about 30%.

In some embodiments, the silica particles may be coated with a stabilizer, such as a metal or a metal-containing material (e.g., aluminum; an aluminum-containing material, such as alumina (i.e., aluminum oxide, or $Al_2O_3$); etc.), which enables the silica particles to remain in solution at relatively low pH (e.g., 10 or less, 8.5 or less, 8 or less, 7 or less, about 3 to about 8, about 4 to about 7, about 3 to about 5, etc.). The presence of a stabilizer on the silica particles may, in some embodiments, enable the colloidal silica to be used in conjunction with an acid (e.g., hydrochloric acid, muriatic acid, etc.).

The hardener/densifier available from Global Polishing Systems, LLC of Henderson, Nev. as CDH-100 is a specific example of a colloidal silica that may be used as an aqueous solution to remove cured cementitious material from equipment that is configured for use with an uncured, or wet, cementitious material.

In some embodiments, a suitable aqueous solution may include about 10% colloidal silica, by weight of the aqueous solution, to about 20% colloidal silica, by weight of the aqueous solution. Since colloidal silica is not harmful to the environment, the disclosed pre-treatment and cleaning processes may be carried out without the requirement of special disposal measures (e.g., those required for disposing of strong acids, which are considered to be a hazardous waste, etc.). Further, it has been discovered that the extent to which aqueous solutions comprising colloidal silica soften cured cement and concrete exceeds the extents to which strong hydrochloric acid and muriatic acid soften the same types of cured cementitious material. The selection of an abrasive element to abrade the surface may be based on the surface or the type of equipment from which the cured cementitious material is being removed.

Without limitation, in specific embodiments, the aqueous solution may be pressurized and directed into (e.g., in a spray, a jetted stream, etc.) the cured cementitious material under pressure. In such embodiments, the pressurized aqueous solution may act as the abrasive element.

In other embodiments, a particulate material may be used to abrade cured cementitious material that has been wetted with an aqueous solution that comprises colloidal silica. Some non-limiting examples of particulate abrasive elements include sand, coal slag, metallic slag, mineral abrasives, metallic abrasives and synthetic abrasives. Such abrasive elements may be directed onto the cured cementitious material in any manner that will facilitate removal of the cured cementitious material from the surface without damaging the surface. A particulate abrasive element may be applied under pressure (e.g., by a so-called "blasting" process, etc.). The application of a particulate abrasive element may occur while the aqueous solution is being applied to the cured cementitious material (i.e., simultaneously with application of the aqueous solution). Simultaneous application of the aqueous solution and the abrasive element may include mixing the aqueous solution and the abrasive element and delivering them together (i.e., from a common delivery source), or it may include delivering the aqueous solution and the abrasive element from separate delivery sources. Alternatively, a particulate abrasive element may be used to abrade cured cementitious material that was previously wetted, and remains wetted, with an aqueous solution that comprises colloidal silica.

Under some circumstances, larger abrasive elements may be useful for removing cured cementitious material from surfaces of equipment that is configured for use with uncured cementitious materials. Such a circumstance may include the removal of cured cementitious material from a surface that is configured to withstand repeated impact, such as the interior of a drum of equipment for mixing concrete (i.e., a cement mixer). When cured cementitious material builds up on the interior surfaces of a drum of a cement mixer, an aqueous solution that comprises colloidal silica and gravel may be introduced into the interior of the drum. The drum may then be rotated in a direction that keeps the aqueous solution and the gravel in the drum as the colloidal silica and the gravel chemically and mechanically remove the cured cementitious material from interior surfaces of the drum.

As alternatives to the use of a particulate material as an abrasive element to assist in the removal of cured cementitious material from one or more surfaces of equipment configured for use with uncured cementitious materials, a variety of other types of abrasive elements may be used. Some non-limiting examples of abrasive elements that may be used in conjunction with an aqueous solution that comprises colloidal silica to remove cured cementitious material include abrasive pads, abrasive brushes (e.g., wire brushes), grinding elements and the like. These and other types of abrasive elements may be used to assist in the removal of cured cementitious material that has been wetted with the aqueous solution, during and/or after application of the aqueous solution to the cured cementitious material.

Other aspects, as well as features and advantages, of the disclosed subject matter will become apparent to those of ordinary skill in the art through consideration of the disclosure and the appended claims.

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A system for treating equipment for mixing, placing or finishing a cementitious material, comprising:
    an aqueous composition consisting essentially of a colloidal silica, a stabilizer for enabling the colloidal silica to remain suspended at a pH of 10 or less, surfactant, and water, the aqueous composition formulated to include the colloidal silica in an amount that softens cementitious material that previously hardened and adhered to a surface of the equipment; and
    an abrasive element capable of removing cementitious material wetted and softened by the colloidal silica of the aqueous composition from the surface of the equipment.

2. The system of claim 1, further comprising:
a mixer for blending the aqueous composition and the abrasive component to form a treatment mixture; and
a pressurization component for pressurizing the treatment mixture and directing the treatment mixture toward the equipment.

3. The system of claim 1, wherein the abrasive element comprises gravel.

4. The system of claim 1, wherein the stabilizer is coated onto silica particles of the colloidal silica.

5. The system of claim 1, wherein silica particles of the colloidal silica comprise about 1.5% to about 6% of a weight of the aqueous composition.

6. The system of claim 1, wherein silica particles of the colloidal silica comprise about 4.5% of a weight of the aqueous composition.

7. A method for pre-treating equipment for mixing, placing or finishing a cementitious material, comprising:
applying an aqueous composition consisting essentially of colloidal silica, a stabilizer for enabling the colloidal silica to remain suspended at a pH of 10 or less, surfactant, and water to a surface of equipment for mixing, placing or finishing concrete before exposing the surface to wet concrete.

8. The method of claim 7, wherein applying comprises introducing the aqueous composition into a drum of a cement mixer before introducing a mix for a cementitious material into the drum.

9. The method of claim 8, further comprising:
removing the aqueous composition from the drum before introducing the mix into the drum.

10. The method of claim 8, further comprising:
leaving the aqueous composition in the drum while introducing the mix into the drum.

11. The method of claim 7, wherein applying comprises applying the aqueous composition to a surface of a tool for finishing a structure formed from a cementitious material.

12. A method for removing cementitious material from equipment configured for mixing, placing or finishing the cementitious material, comprising:
applying an aqueous composition consisting essentially of colloidal silica, a stabilizer for enabling the colloidal silica to remain suspended at a pH of 10 or less, surfactant, and water to a surface of equipment for mixing, placing or finishing cementitious material to enable the colloidal silica to soften the cementitious material that previously hardened and adhered to the surface of the equipment; and
abrading the cementitious material softened by the colloidal silica of the aqueous composition from the surface.

13. The method of claim 12, wherein applying the aqueous composition comprises introducing the aqueous composition into a drum of a cement mixer.

14. The method of claim 12, wherein applying the aqueous composition comprises applying the aqueous composition to a surface of equipment configured to finish a structure defined by the cementitious material.

15. The method of claim 14, wherein applying the aqueous composition comprises applying the aqueous composition to a blade of a power trowel.

16. The method of claim 12, wherein applying the aqueous composition comprises applying the aqueous composition to cured cementitious material on the surface of the equipment.

17. The method of claim 16, wherein applying the aqueous composition to the cured cementitious material comprises applying the aqueous composition to cured concrete on an interior surface of a drum of a cement mixer.

18. The method of claim 15, wherein abrading the surface comprises introducing gravel into the drum of the cement mixer.

19. The method of claim 16, wherein applying the aqueous composition to the cured cementitious material comprises applying the aqueous composition to cured concrete on a blade of a power trowel.

* * * * *